(12) United States Patent
Chen et al.

(10) Patent No.: US 8,364,763 B2
(45) Date of Patent: Jan. 29, 2013

(54) METHOD AND SYSTEM FOR IMPROVING EFFICIENCY OF EMAIL FORWARDING BY REMOVING DUPLICATION

(75) Inventors: Li Chen, Cary, NC (US); Yongcheng Li, Cary, NC (US); Lun Xiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 11/833,845

(22) Filed: Aug. 3, 2007

(65) Prior Publication Data

US 2009/0037542 A1  Feb. 5, 2009

(51) Int. Cl.
*G06F 15/16* (2006.01)
(52) U.S. Cl. ........................................ 709/206; 709/224
(58) Field of Classification Search .................. 709/206, 709/224
See application file for complete search history.

(56) References Cited

U.S. PATENT DOCUMENTS

| | | | |
|---|---|---|---|
| 2005/0198579 A1* | 9/2005 | Perepa et al. | 715/752 |
| 2006/0080393 A1* | 4/2006 | Cardone et al. | 709/206 |
| 2007/0124383 A1* | 5/2007 | Hebert et al. | 709/206 |
| 2008/0256198 A1* | 10/2008 | Kamat | 709/206 |
| 2010/0174784 A1* | 7/2010 | Levey et al. | 709/206 |

* cited by examiner

*Primary Examiner* — Asad Nawaz
*Assistant Examiner* — Najeebuddin Ansari
(74) *Attorney, Agent, or Firm* — Jeffrey T. Holman

(57) ABSTRACT

In a method and system for removing email forwarding duplication, when an email was sent for the first time, the email was assigned a unique identifier. An aggregate recipient list was created and associated with the unique identifier. When the email is to be forwarded, the aggregate recipient list has recipients previously forwarded the email. The recipient list of the forwarding email is compared with the aggregate recipient list. If duplicate email addresses are found, the duplicate email addresses are displayed to a sender of the forwarding email. If the sender chooses not to send the forwarding email to the duplicate email addresses, the duplicate email addresses are removed from the recipient list of the forwarding email. New recipients of the forwarding email are added to the aggregate recipient list. The forwarding email with the unique identifier is sent to the recipient list.

13 Claims, 3 Drawing Sheets

METHOD AND SYSTEM FOR IMPROVING EFFICIENCY OF EMAIL FORWARDING BY REMOVING DUPLICATION

BACKGROUND OF THE INVENTION

Email has enabled businesses to improve communications and share information. Used effectively, email can also help businesses to improve efficiency. Email systems have been enhanced in many ways to increase the convenience and efficiency of its use. In current email systems, users can forward emails to an individual or a group of individuals to share valuable information. However, multiple users may forward the same email to the same user. If a recipient's address happens to be in more than one distribution group (or in both the original recipient list and the forwarded group), the recipient will receive the same email multiple times. The reading of duplicated messages lowers the efficiency for the receiver.

Duplicate forwarded emails can be received in two ways: horizontal duplication and vertical/cyclic duplication. In horizontal duplication, multiple senders forward the same email to their respective distribution groups, and their distribution groups overlap. For example, John is the project manager for a project named Magic. Mary is the development manager for Magic, so she includes John in her email distribution list. John reports to Robert, therefore John is also on Robert's distribution list. There is a new development process in the company where John, Mary and Robert work. This new process is communicated to Robert and Mary through identical emails sent by their managers. When Robert and Mary forward the emails from their managers to the people who work for them, John receives two emails with identical content from Robert and Mary regarding this new process.

In vertical duplication, a recipient belongs to more than one distribution list along the email forwarding path. For example, John and Mary are members of an architectural board, and John's manager is Robert. John receives an email with an overview of a new project, and forwards the email to the rest of the architectural board. Mary receives John's email and forwards the email to Robert. Robert forwards the email to his department, which includes John. John receives the forwarded email he had forwarded himself.

BRIEF SUMMARY OF THE INVENTION

In a method and system for removing email forwarding duplication, when an email was sent the first time, the email was assigned a unique identifier. An aggregate recipient list was created and associated with the unique identifier. The aggregate recipient list has recipients previously sent the email. When the email is to be forwarded, the recipient list of the forwarding email is compared with the aggregate recipient list. If duplicate email addresses are found, the duplicate email addresses are displayed to a sender of the forwarding email. If the sender chooses not to send the forwarding email to the duplicate email addresses, the duplicate email addresses are removed from the recipient list of the forwarding email. New recipients of the forwarding email are added to the aggregate recipient list. The forwarding email with the unique identifier is sent to the recipient list.

DETAILED DESCRIPTION OF THE INVENTION

The present invention provides a method and system for removing email forwarding duplication. The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system for removing email forwarding duplication assign unique identifiers (ID) to new emails, create an aggregate recipient list to which the recipients of the email are added, associates the aggregate recipient list with the unique ID, and stores the unique ID and the aggregate recipient list. Each time the email is to be forwarded, the aggregated recipient list associated with the unique ID is retrieved, and the recipient list of the forwarding email is checked for duplicates against the aggregated recipient list. Duplicate recipients can be removed from the recipient list of the forwarding email. New recipients are added to the aggregated recipient list and stored. The forwarding email is then sent to the recipients, along with the unique ID.

In an exemplary embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 1:
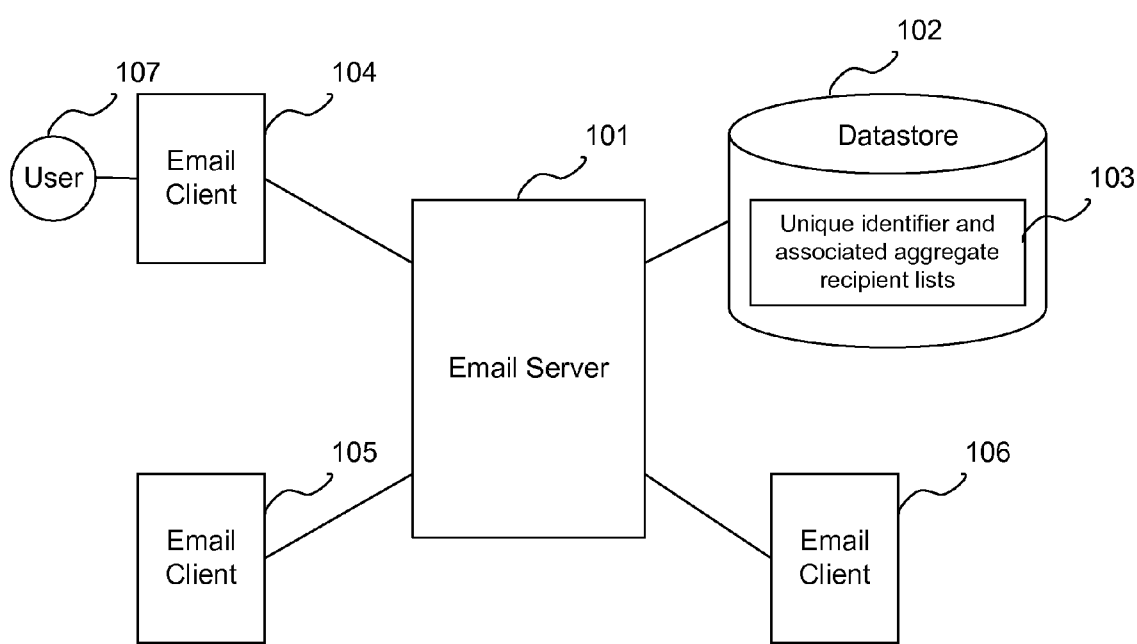
FIG. 1 illustrates an exemplary embodiment of a system for removing email forwarding duplication.

FIG. 1 illustrates an exemplary embodiment of a system for removing email forwarding duplication. The system includes an email server 101 for providing email service to a plurality of email clients 104-106. The email server 101 has access to a datastore 102, which stores unique IDs assigned to emails and their associated aggregated recipient lists 103, as described further below. In one exemplary embodiment, the datastore 102 is an email database, but the datastore 102 can be any other type of storage mechanism without departing from the spirit and scope of the invention.

Figure 2:
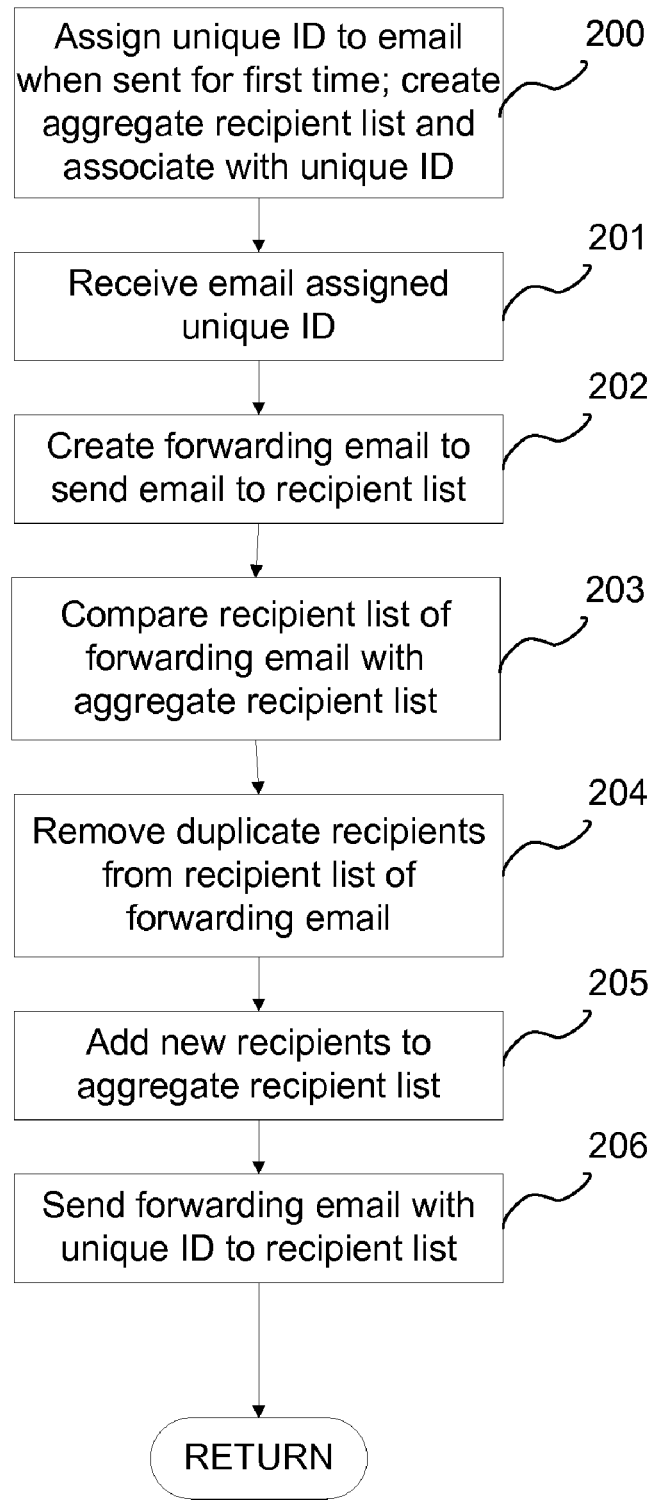
FIG. 2 illustrates an exemplary embodiment of a method for removing email forwarding duplication.

FIG. 2 illustrates an exemplary embodiment of a method for removing email forwarding duplication. Referring to both FIGS. 1 and 2, when an email is sent for the first time, the email is assigned a unique ID. An aggregate recipient list 103 is also created and associated with the unique ID (step 200).

The recipients of the email are added to the aggregate recipient list 103. The aggregate recipient list 103 contains a history of recipients who have been sent the email assigned the same unique ID. A user 107 receives the email assigned the unique ID (step 201). When a user 107 decides to forward the email, the user 107 instructs the email client 104 to create a forwarding email to send the received email to a recipient list (step 202). In this specification, a "forwarding email" forwards a copy of an email received from another user to one or more recipients. Typically, the email client 104 creates the forwarding email when the user 107 selects the "forward" button on his email application.

The email client 104 compares the recipient list for the forwarding email with the aggregate recipient list 103 associated with the unique ID stored at the datastore 102 (step 203). The aggregate recipient list 103 is retrieved from the datastore 102 so that the comparison can be performed. From this comparison, duplicate recipients are identified. Alternatively, the comparison can be performed by the email server 101. Here, the email client 104 sends the forwarding email recipient list to the email server 101 for the comparison, with the results of the comparison sent to the email client 104 by the email server 101. The email client 104 can then remove duplicate recipients from the recipient list of the forwarding email (step 204), while new recipients are added to the aggregate recipient list 103 (step 205). The email client 104 then sends the forwarding email with the unique ID to the recipient list (step 206).

Steps 201 through 206 are repeated each time the email is forwarded. When the original email was created, the unique ID was assigned to the email and stored at the datastore 102. The forwarding emails maintain the same unique ID throughout the email forwarding chain. The unique ID can be sent as part of the header of the forwarding emails. An email forwarding chain is a set of email forwarding steps, where in each step, the user who forwards the email does not add new information on top of the forwarded email, except for non-essential messages, such as "FYI", "please read", etc. A user can start a new email forwarding chain when enough new content is added to a forwarding email. This forwarding email is treated as a new email and assigned a new unique ID.

In the exemplary embodiment, the headers and bodies of the forwarded emails within the email forwarding chain are hidden by default, and a brief forwarding path is substituted. The brief forwarding path is used to prevent distraction of the user when reading the original email content. Optionally, a user can choose to display the full forwarding path.

The parameters of the email forwarding duplication removal feature can be configurable by a user. For example, a user can set an expiration period, after which the unique ID is no longer valid. Optionally, the unique ID can be set to automatically expire after a certain amount of time after the last forwarding activity. Once the unique ID is no longer valid, the mapping of the aggregate recipient list to with the unique ID is cleared from the datastore 102.

The email forwarding chain can have many branches, as multiple recipients of forwarded email can forward the same email to others. For each branch, the same unique ID is maintained and associated with a single, global aggregate recipient list 103.

Figure 3:
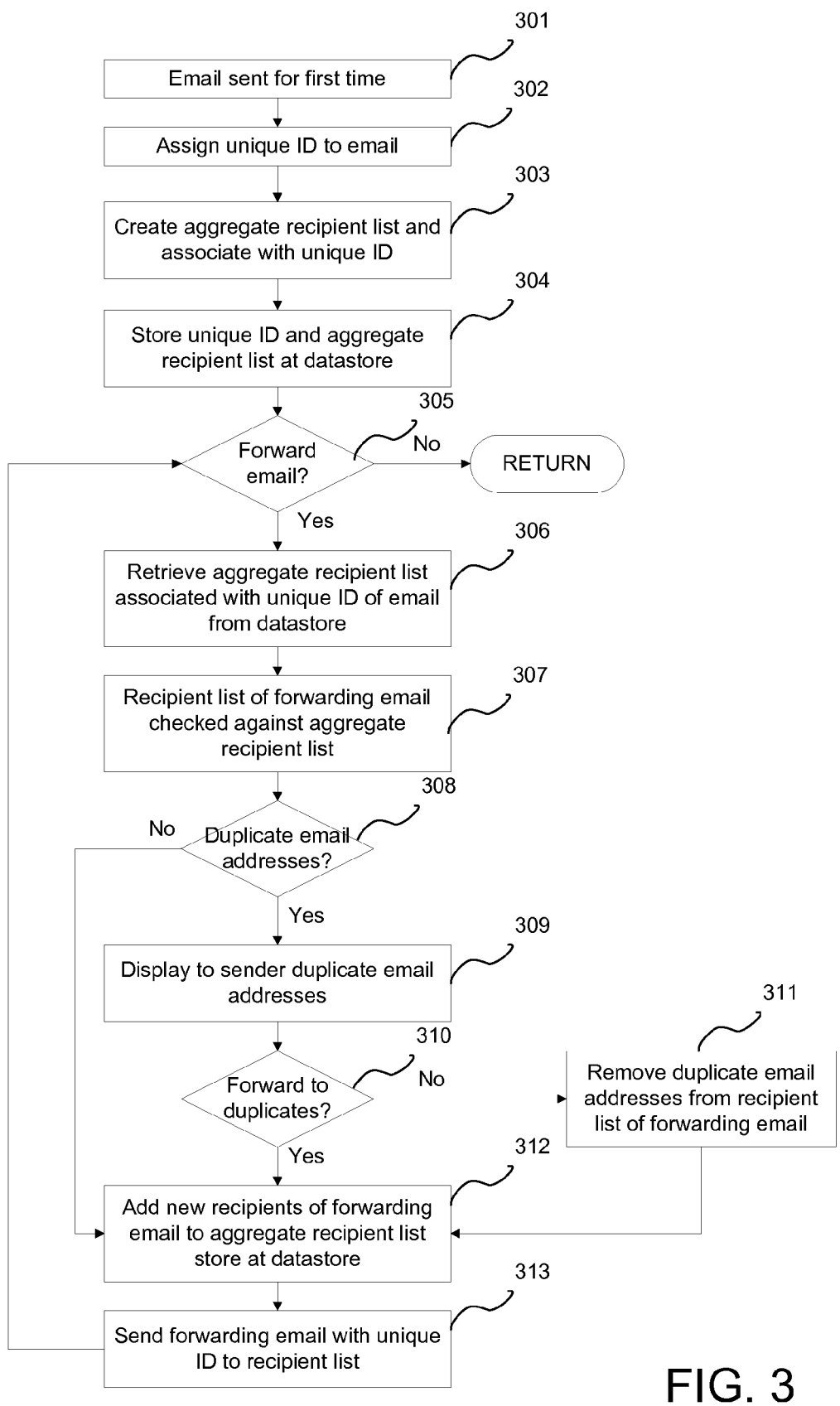
FIG. 3 illustrates in more detail the exemplary embodiment of a method for removing email forwarding duplication.

FIG. 3 illustrates in more detail the exemplary embodiment of a method for removing email forwarding duplication. When an email is sent for the first time (step 301), the email is assigned a unique ID (step 302). An aggregate recipient list 103 is created, to which the recipients of the email are added. The aggregate recipient list 103 is associated with the unique ID (step 303). The unique ID and the aggregate recipient list are stored at the datastore 102 (step 304). When a user 107 decides to forward the email (step 305), the email client 104 retrieves the aggregate recipient list 103 associated with the unique ID of the email from the datastore 102 (step 306). The recipient list of the forwarding email is checked against the aggregate recipient list 103 (step 307). If duplicate email addresses are identified (step 308), the duplicate email addresses are displayed to the sender of the forwarding email (step 309). The sender can choose whether or not to send the forwarding email to the duplicate email addresses. If the sender chooses not to send (step 310), the email client 104 removes the duplicate email addresses from the recipient list of the forwarding email (step 311). Any other parameters for the email forwarding duplication removal feature can be configured by the user 107.

New recipients of the forwarding email are added to the aggregate recipient list 103 by the email client 104 and stored in the datastore 102 (step 312). The email client 104 sends the forwarding email with the unique ID to the recipient list (step 313). Steps 306 through 313 are repeated each time the forwarding email is further forwarded.

Consider the horizontal distribution example set forth above, where John is the project manager for a project named Magic. Mary is the development manager for Magic, so she includes John in her email distribution list. John reports to Robert, therefore John is also on Robert's distribution list. There is a new development process in the company where John, Mary, and Robert work. Robert and Mary receive identical emails sent to them by their managers (step 301). The email was assigned a unique ID when the email was created (step 302). The aggregate recipient list 103 was also created, associated with the unique ID, and stored at the datastore 102 (steps 303-304).

Robert then decides to forward the email to his distribution list, which includes John (step 305). The aggregate recipient list 103 associated with the unique ID of the email is retrieved from the datastore 102 (step 306). The recipient list of Robert's forwarding email is checked against the aggregate recipient list 103 (step 307). Assume that this check finds no duplicate email addresses (step 308). The recipients of Robert's forwarding email are added to the aggregate recipient list 103 and stored at the datastore 102 (step 312). Robert's forwarding email with the unique ID is then sent to the recipient list (step 313). John receives the forwarded email from Robert.

Mary decides to forward the email to her distribution list, which also includes John (step 305). The aggregate recipient list 103 associated with the unique ID of the email is retrieved from the datastore 102 (step 306). The recipient list of Mary's forwarding email, which includes John, is checked against the aggregate recipient list 103 (step 307). This check finds John's email address is a duplicate email address (step 308), and John's email address is displayed to Mary (step 309). Assume that Mary decides not to send the forwarding email to John (step 310). John's email address is removed from the recipient list of Mary's forwarding email (step 311). New recipients of the forwarding email are added to the aggregate recipient list 103 and stored at the datastore 102 (step 312). Mary's forwarding email with the unique ID is then sent to the recipient list (step 313), which does not include John. Thus, John does not receive duplicate forwarded emails.

Consider also the vertical distribution example set forth above, where John and Mary are members of an architectural board, and Robert is John's manager. John is sent an email with an overview of a new project (step 301). The email was assigned a unique ID when the email was created (step 302).

An aggregate recipient list 103 was also created, associated with the unique ID, and stored at the datastore 102 (step 303-304).

John decides to forward the email to fellow board members (step 305). The aggregate recipient list 103 associated with the unique ID of the email is retrieved from the datastore 102 (step 306). The recipient list of John's forwarding email, which includes Mary, is checked against the aggregate recipient list 103 (step 306). Assume that this check finds no duplicate email addresses (step 308). The recipients of John's forwarding email are added to the aggregate recipient list 103 and stored at the datastore 102 (step 312). John's forwarding email with the unique ID is then sent to the recipient list (step 313). Mary receives the forwarded email from John.

Mary decides to forward John's email to Robert (step 305). The aggregate recipient list 103 associated with the unique ID of the email is retrieved from the datastore 102 (step 306). The recipient list of Mary's forwarding email, which includes Robert, is checked against the aggregate recipient list 103 (step 307). Assume that no duplicate email addresses are found (step 308). New recipients of the forwarding email are added to the aggregate recipient list 103 and stored at the datastore 102 (step 312). Mary's forwarding email with the unique ID is then sent to the recipient list (step 313). Robert receives the forwarded email from Mary.

Robert decides to forward the email from Mary to his department, which includes John (step 305). The aggregate recipient list 103 associated with the unique ID of the email is retrieved from the datastore 102 (step 306). The recipient list of Robert's forwarding email, which includes John, is checked against the aggregate recipient list 103 (step 307). This check finds John's email address is a duplicate email address (step 308), and John's email address is displayed to Robert (step 309). Assume that Robert decides not to send the forwarding email to John (step 310). John's email address is removed from the recipient list of Robert's forwarding email (step 310). New recipients of the forwarding email are added to the aggregate recipient list 103 and stored at the datastore 102 (step 312). Robert's forwarding email with the unique ID is then sent to the recipient list (step 313), which does not include John. Thus, John does not receive duplicate forwarded emails.

A method and system for removing email forwarding duplication have been disclosed. In the method and system, when an email was sent for the first time, the email was assigned a unique identifier. An aggregate recipient list was created and associated with the unique identifier. The aggregate recipient list has recipients previously sent the email. When the email is to be forwarded, the recipient list of the forwarding email is compared with the aggregate recipient list. If duplicate email addresses are found, the duplicate email addresses are displayed to a sender of the forwarding email. If the sender chooses not to send the forwarding email to the duplicate email addresses, the duplicate email addresses are removed from the recipient list of the forwarding email. New recipients of the forwarding email are added to the aggregate recipient list. The forwarding email with the unique identifier is sent to the recipient list.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for removing email forwarding duplication, comprising:

creating via an email client a first forwarding email to send an email to a recipient list, the email assigned a unique identifier;

retrieving via the email client an aggregate recipient list associated with the unique identifier, the aggregate recipient list comprising recipients previously sent the email, the aggregate recipient list being stored on a data storage device, wherein both the aggregate recipient list and the data storage device are commonly accessible to multiple email clients;

comparing via the email client the recipient list of the first forwarding email with the aggregate recipient list;

identifying a duplicate recipient based on the comparing of the first forwarding email with the aggregate recipient list;

removing via the email client the duplicate recipient from the recipient list of the first forwarding email;

sending via the email client the first forwarding email to the recipient list, the recipient list having been modified as a result of the removing of the duplicate recipient from the recipient list of the first forwarding email, the recipient list comprising a first recipient and a second recipient;

adding recipients of the sent first forwarding email to a same instance of the aggregate recipient list;

adding a third recipient to the same instance of the aggregate recipient list in response to the first recipient both receiving and then directly forwarding the first forwarding email in a second forwarding email to the third recipient, wherein the added third recipient is a first instance of the third recipient in the aggregate recipient list; and adding a fourth recipient to the same instance of the aggregate recipient list in response to the second recipient both receiving and then directly forwarding the first forwarding email in a third forwarding email to the fourth recipient, wherein the added fourth recipient is an initial instance of the fourth recipient in the aggregate recipient list.

2. The method of claim 1, further comprising:

determining that the first forwarding email is being sent for a first time; and in response to the determining that the first forwarding email being sent for the first time,
assigning the unique identifier to the email,
creating the aggregate recipient list, wherein recipients of the email are added to the aggregate recipient list,
associating the aggregate recipient list with the unique identifier of the email, and
storing the aggregate recipient list.

3. The method of claim 1, wherein the comparing comprises:

retrieving the aggregate recipient list associated with the unique identifier of the email;

comparing the recipient list of the first forwarding email with the aggregate recipient list; and in response to duplicate email addresses being found, displaying the duplicate email addresses to a sender of the first forwarding email.

4. The method of claim 3, wherein the removing comprises:

determining that the first forwarding email is to be sent to the duplicate email addresses; and in response to the determining that the first forwarding email is not to be sent to the duplicate email addresses, removing the duplicate email addresses from the recipient list of the first forwarding email.

5. A method for removing email forwarding duplication, comprising:
   creating via an email client a first forwarding email to send an email to a recipient list, the email assigned a unique identifier, wherein an aggregate recipient list is associated with the unique identifier, the aggregate recipient list comprising recipients previously sent the email, the aggregate recipient list being stored on a data storage device, wherein both the aggregate recipient list and the data storage device are commonly accessible to multiple email clients;
   retrieving via the email client the aggregate recipient list associated with the unique identifier of the email;
   comparing via the email client the recipient list of the first forwarding email with the aggregate recipient list;
   identifying a duplicate recipient based on the comparing of the first forwarding email with the aggregate recipient list;
   displaying via the email client the duplicate recipient to a sender of the first forwarding email;
   receiving confirmation from the sender that the first forwarding email is not to be sent to the duplicate recipient;
   removing via the email client the duplicate recipient from the recipient list of the first forwarding email;
   adding via the email client new recipients of the first forwarding email to the aggregate recipient list and storing the aggregate recipient list; and
   sending via the email client the first forwarding email with the unique identifier to the recipient list, the recipient list having been modified as a result of the removing of the duplicate recipient from the recipient list of the first forwarding email, the recipient list comprising a first recipient and a second recipient;
   adding recipients of the sent first forwarding email to a same instance of the aggregate recipient list;
   adding a third recipient to the same instance of the aggregate recipient list in response to the first recipient both receiving and then directly forwarding the first forwarding email in a second forwarding email to the third recipient, wherein the added third recipient is a first instance of the third recipient in the aggregate recipient list; and
   adding a fourth recipient to the same instance of the aggregate recipient list in response to the second recipient both receiving and then directly forwarding the first forwarding email in a third forwarding email to the fourth recipient, wherein the added fourth recipient is an initial instance of the fourth recipient in the aggregate recipient list.

6. A system, comprising:
   a data storage device, comprising a unique identifier for an email and an aggregate recipient list associated with the unique identifier, the aggregate recipient list comprising recipients previously sent the email; and
   an email client, wherein the email client:
      creates a first forwarding email to send the email to a recipient list,
      retrieves the aggregate recipient list associated with the unique identifier of the email from the data storage device, wherein both the aggregate recipient list and the data storage device are commonly accessible to multiple email clients,
      compares the recipient list of the first forwarding email with the aggregate recipient list,
      identifies a duplicate recipient based on the comparing of the first forwarding email with the aggregate recipient list;
      removes the duplicate recipient from the recipient list of the first forwarding email;
      adds new recipients of the first forwarding email to the aggregate recipient list and stores the aggregate recipient list at the data storage device;
      sends the first forwarding email to the recipient list, the recipient list having been modified as a result of the removing of the duplicate recipient from the recipient list of the first forwarding email, the recipient list comprising a first recipient and a second recipient;
      adds recipients of the sent first forwarding email to a same instance of the aggregate recipient list;
      adds a third recipient to the same instance of the aggregate recipient list in response to the first recipient both receiving and then directly forwarding the first forwarding email in a second forwarding email to the third recipient, wherein the added third recipient is a first instance of the third recipient in the aggregate recipient list; and
      adds a fourth recipient to the same instance of the aggregate recipient list in response to the second recipient both receiving and then directly forwarding the first forwarding email in a third forwarding email to the fourth recipient, wherein the added fourth recipient is an initial instance of the fourth recipient in the aggregate recipient list.

7. The system of claim 6, wherein the email client further determines that the email is being sent for a first time, wherein in response to the determination that the email is being sent for the first time, the email client:
   assigns the unique identifier to the email;
   creates the aggregate recipient list, wherein recipients of the email are added to the aggregate recipient list;
   associates the aggregate recipient list with the unique identifier of the email; and
   stores the aggregate recipient list at the data storage device.

8. The system of claim 6, wherein the comparing by the email client comprises:
   comparing the recipient list of the first forwarding email with the aggregate recipient list; and
   in response to duplicate email addresses being found, displaying the duplicate email addresses to a sender of the first forwarding email.

9. The system of claim 8, wherein the removing by the email client comprises:
   determining that the first forwarding email is to be sent to the duplicate email addresses; and
   in response to the determining that the first forwarding email is not to be sent to the duplicate email addresses, removing the duplicate email addresses from the recipient list of the first forwarding email.

10. A computer program product comprising a non-transitory computer useable storage medium having a computer readable program, wherein the computer readable program when executed on a computer causes the computer to:
   create via an email client a first forwarding email to send an email to a recipient list, the email assigned a unique identifier;
   retrieve via the email client an aggregate recipient list associated with the unique identifier, the aggregate recipient list comprising recipients previously sent the email, the aggregate recipient list being stored on a data storage device, wherein both the aggregate recipient list and the data storage device are commonly accessible to multiple email clients;

compare via the email client the recipient list of the first forwarding email with the aggregate recipient list;

identifying a duplicate recipient based on the comparing of the first forwarding email with the aggregate recipient list;

remove via the email client the duplicate recipient from the recipient list of the first forwarding email;

send via the email client the first forwarding email with the unique identifier to the recipient list, the recipient list having been modified as a result of the removing of the duplicate recipient from the recipient list of the first forwarding email, the recipient list comprising a first recipient and a second recipient;

adding recipients of the sent first forwarding email to a same instance of the aggregate recipient list;

adding a third recipient to the same instance of the aggregate recipient list in response to the first recipient both receiving and then directly forwarding the first forwarding email in a second forwarding email to the third recipient, wherein the added third recipient is a first instance of the third recipient in the aggregate recipient list; and adding a fourth recipient to the same instance of the aggregate recipient list in response to the second recipient both receiving and then directly forwarding the first forwarding email in a third forwarding email to the fourth recipient, wherein the added fourth recipient is an initial instance of the fourth recipient in the aggregate recipient list.

11. The computer program product of claim 10, wherein the computer readable program, when executed on the computer, causes the computer to:

determine that the email is being sent for a first time; and in response to the determination that the email is being sent for the first time,
assign the unique identifier to the email,
create the aggregate recipient list, wherein recipients of the email are added to the aggregate recipient list,
associate the aggregate recipient list with the unique identifier of the email, and
store the aggregate recipient list.

12. The computer program product of claim 10, wherein the comparison of the recipient list of the first forwarding email with the aggregate recipient list further comprises operations to:

retrieve the aggregate recipient list associated with the unique identifier of the email;

compare the recipient list of the first forwarding email with the aggregate recipient list; and in response to duplicate email addresses being found, display the duplicate email addresses to a sender of the first forwarding email.

13. The computer program product of claim 12, wherein the removal of the duplicate recipient from the recipient list of the first forwarding email further comprises operations to:

determine that the first forwarding email is to be sent to the duplicate email addresses; and if the first forwarding email is not to be sent to the duplicate email addresses, remove the duplicate email addresses from the recipient list of the first forwarding email.

* * * * *